US005673638A

United States Patent [19]
Keeton

[11] Patent Number: 5,673,638
[45] Date of Patent: Oct. 7, 1997

[54] RESILIENT SEED FIRMING ATTACHMENT FOR A PLANTING MACHINE

[75] Inventor: Eugene G. Keeton, Trenton, Ky.

[73] Assignee: J & K Keeton Enterpriseses, Inc., Moline, Ill.

[21] Appl. No.: 667,300

[22] Filed: Jun. 20, 1996

Related U.S. Application Data

[63] Continuation of Ser. No. 137,844, Oct. 15, 1993, abandoned.

[51] Int. Cl.⁶ ........................................................ A01C 5/06
[52] U.S. Cl. ...................... 111/167; 111/186; 111/189; 111/197; 172/612
[58] Field of Search .................... 111/189, 197, 111/198, 148, 150, 176, 187, 167; 172/612

[56] References Cited

U.S. PATENT DOCUMENTS

| 221,004 | 10/1879 | Strayer. | |
| 252,265 | 1/1882 | Scofield | 111/197 |
| 410,438 | 9/1889 | Patric | 111/197 |
| 889,947 | 6/1908 | Miller. | |
| 909,137 | 1/1909 | Bellerive. | |
| 2,533,374 | 12/1950 | Hyland | 111/150 |
| 2,872,883 | 2/1959 | Padrick | 111/150 |
| 4,253,412 | 3/1981 | Hogenson | 111/189 |
| 5,092,255 | 3/1992 | Long et al. | 111/197 |

FOREIGN PATENT DOCUMENTS

| 3114771 | 10/1982 | Germany | 111/197 |
| 3321490 | 12/1984 | Germany | 111/189 |
| 3441610 | 5/1986 | Germany | 111/197 |

*Primary Examiner*—Terry Lee Melius
*Assistant Examiner*—Christopher J. Novosad
*Attorney, Agent, or Firm*—Dressler, Rockey, Milnamow & Katz, Ltd.

[57] ABSTRACT

A resilient seed firming attachment for a planting machine designed to effectively place seed at a consistent depth and at consistent spacing. The attachment may be of any geometrical configuration having a length adequate to firm the seed in the opened furrow and is mounted in a position trailing the discharge end of a seed boot. The resilience of the seed firming attachment being of sufficient force to pressure the seed into the soil at the desired planting depth, but flexible enough so as to not disturb the depth obtained by the furrow opening device.

16 Claims, 3 Drawing Sheets

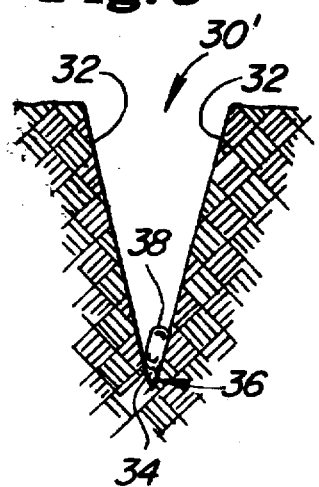
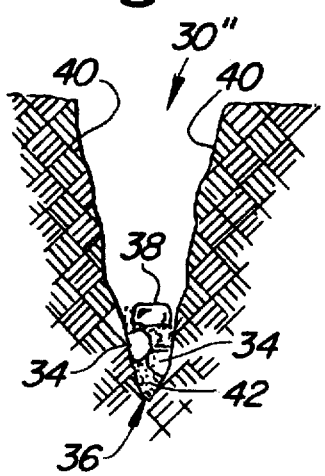
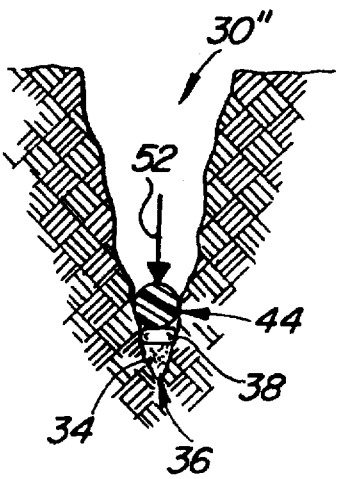
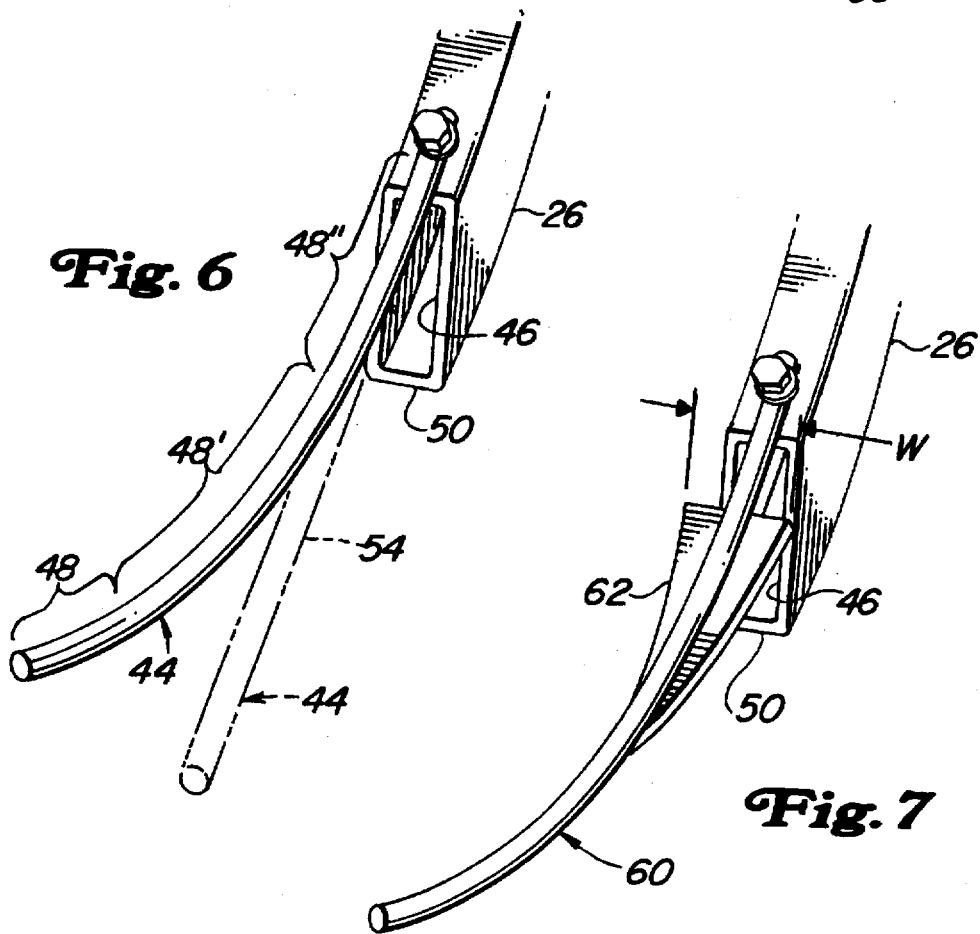

5,673,638

RESILIENT SEED FIRMING ATTACHMENT FOR A PLANTING MACHINE

This application is a continuation of application Ser. No. 08/137,844 filed on Oct. 15, 1993, now abandoned.

BACKGROUND OF THE INVENTION

1) Field of the Invention

The present invention relates to planting implements and more specifically to an attachment to a planter seed boot to improve seed depth and distance.

2) Related Art

It is well-known that for optimum seed germination the kernels must be placed at the proper soil depth, where the seed will receive the correct moisture and temperature. Test results indicate that emerging short plants may be from seeds planted at deeper depths which has retarded their emergence, while seeds planted too shallow will not properly germinate and emerge due to dry soil conditions at shallower depths. Other problems occurring with current high speed planting techniques are seed bounce and undesired soil residuals and/or air pockets within and at the bottom of the opened furrow, both which not only effect proper seed spacing but also seed depth.

Many devices have been utilized to correct the aforementioned problems. One such device is disclosed in U.S. Pat. No. 5,092,255 Long et al. in which a strap is employed to prevent the seeds from bouncing out of the furrow. Although this invention may reduce the seed bounce problem, the strap configuration is designed to operate above the seeds in the furrow and does not conform and cannot touch the bottom of "V" groove furrow obtained by the opening device a separate closing wheel firms the seed in the furrow. Such a device is shown in FIG. 8 in a cross-sectional view of a furrow. The strap is able to penetrate the furrow only to a depth where the furrow width is equal to the strap width clearly above the apex of the furrow. Other inventions disclose the use of baffles to reduce the problem of seed bounce such as disclosed in U.S. Pat. No. 4,669,922 Hooper et al. Another invention disclosed the use of loosely joined plates, U.S. Pat. No. 4,253,412 Hogenson, to deflect the seed to the lowermost portion of the opened furrow.

Although these and other inventions seek ways to reduce seed bounce, none offer a device for firming the kernel into the soil at the optimum depth or firm the seed at the desired planting depth as determined by the setting of the opener while at the same time reducing seed bounce. Residual soil in the furrow causing undesired air pockets under the kernel are eliminated as the seed firming attachment of this invention firmly presses the kernel into the bottom of the furrow.

BRIEF SUMMARY OF THE INVENTION

It is therefore an object of the present invention to provide a device which will reduce seed bounce and direct the seed to the bottom of the furrow. Another object of the present invention is to provide a resilient device which firms the kernel or seed into the soil at the bottom of the opened furrow thereby reducing air pockets. It is another object of the invention to provide a seed firming attachment which can be readily attached to an existing planter assembly or seed boot. Another object is to provide a seed firming attachment which is low in cost to manufacture, resistant to wear and soil build-up. Another object of the present invention is to provide a resilient seed firming device which has sufficient stiffness so as to compact loose soil residual accumulated at the bottom of an opened furrow while not altering the furrow depth.

BRIEF DESCRIPTION OF THE DRAWINGS

FIG. 3—is a cross-sectional view of an "ideal" opened furrow.

FIG. 4—is a cross-sectional view taken along line 4—4 of FIG. 2.

FIG. 5—is a cross-sectional view taken along line 5—5 of FIG. 2.

FIG. 6—is a perspective view of one embodiment of the present invention fastened to the discharge end of a planter seed boot.

FIG. 7—is a view similar to FIG. 6 depicting an alternate embodiment of the resilient seed firming attachment.

DETAILED DESCRIPTION OF THE DRAWINGS

Figure 1:
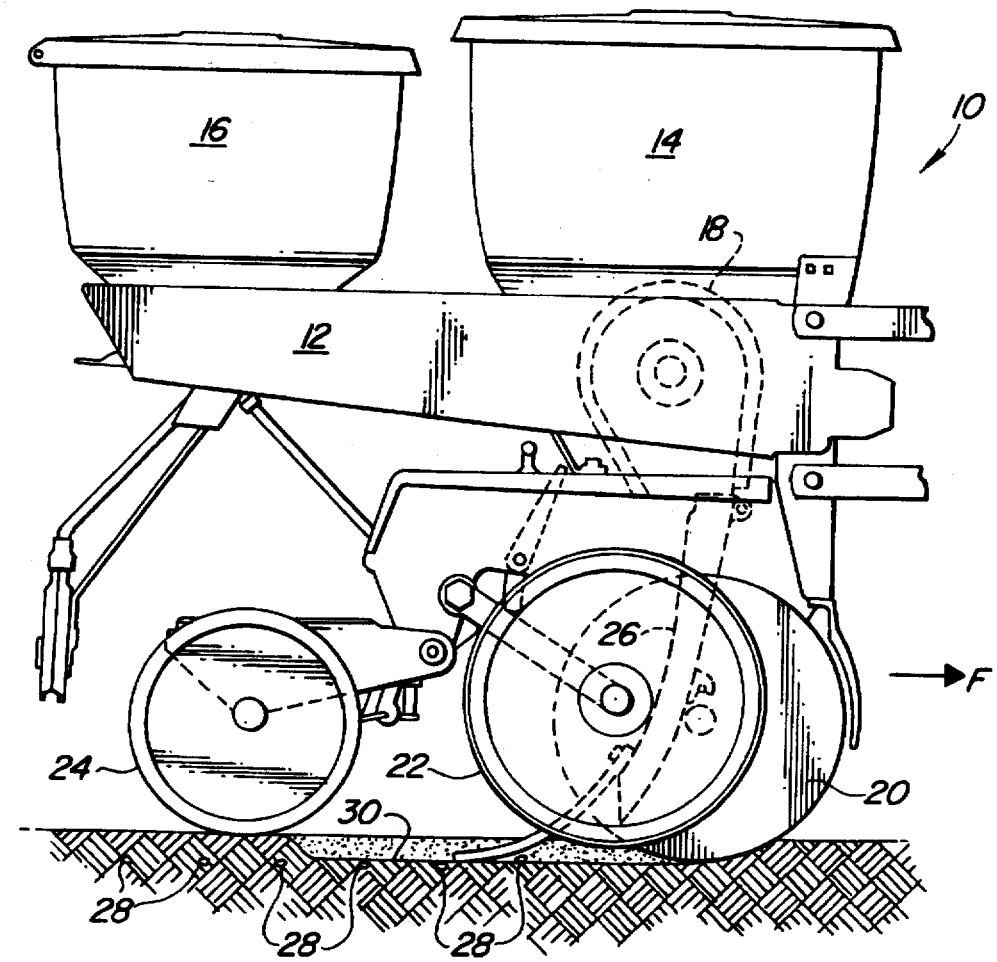
FIG. 1—is a side elevation view of a typical planting unit.

Referring now to FIG. 1, therein is shown a planting unit 10 to be drawn across a field in a forward direction as indicated by "F". The planting unit 10 generally includes a main frame 12 supporting the following components: A seed hopper 14 and a fertilizer hopper 16; a seed metering unit 18 which receives kernels from seed hopper 14; a furrow opening device 20; a gage wheel assembly 22 pivotally connected to the main frame 12 providing various planting positions with respect to the furrow opening device 20; a furrow closing device 24 which covers the deposited kernels with soil and a seed boot 26 which receives kernels 28 from the seed metering unit 18 and directs them into the opened furrow 30. The resilient seed firming member 44 is shown in a flexed position. The flex may be caused by a portion of the weight of the planter forcing member 44 against the soil or other means may be used to apply pressure to the member 44 at the bottom of the furrow.

Referring now to FIG. 3, a cross-sectional view of an opened furrow 30' is shown. In this depiction, a conventional double disk opener (not shown) has formed an ideal furrow in perfect moisture soil, having smooth converging vertical walls 32 with little or no soil residuals 34 located in the furrow apex 36 of the furrow 30' and the best soil moisture content available. A kernel 38 is shown deposited at the proper depth awaiting the closing operation. FIG. 4 illustrates a cross-sectional view of an opened furrow 30" having jagged converging vertical walls 40 resulting from forward movement of opener in drier or other less than optimum soil conditions. Soil residuals 34 from the jagged converging vertical walls 40 accumulate at the furrow apex 36 of the opened furrow 30", causing air pockets 42 and improper depth placement of the kernel 38 when the furrow is closed by the normal closing means.

Figure 2:
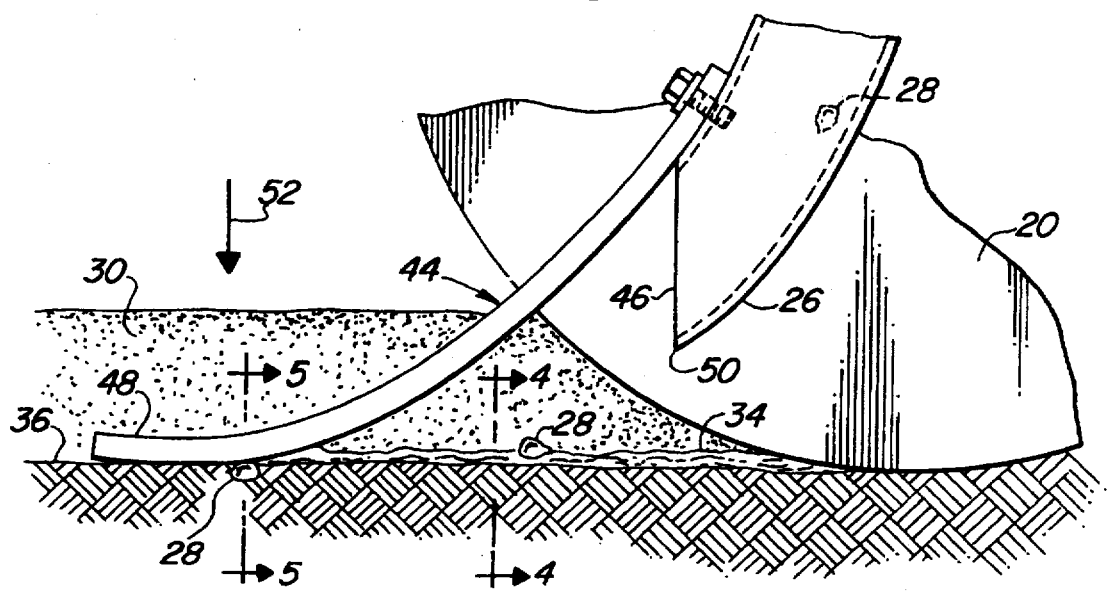
FIG. 2—is an enlarged cross-sectional view of the furrow opening device depicting the resilient seed firming interacting with seed in the opened furrow.
Figure 8:
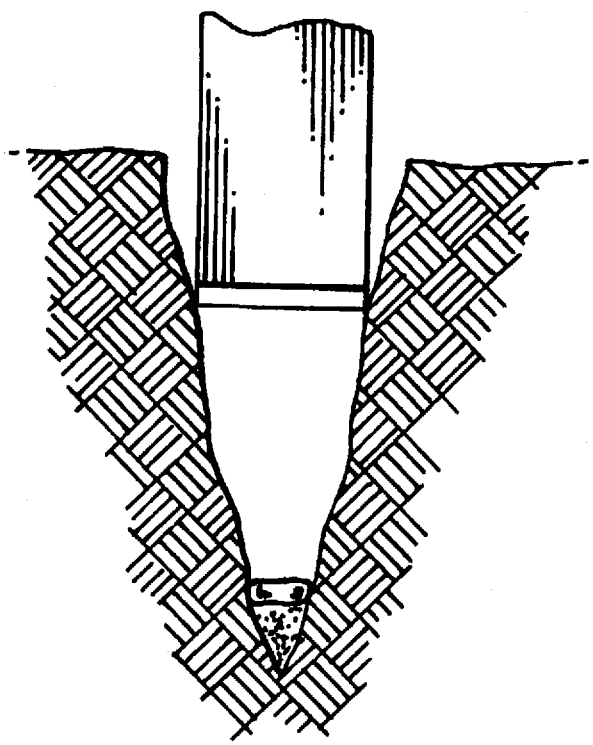
FIG. 8—is a cross-sectional view of an opened furrow with a prior art device in said furrow.

Referring to FIG. 2, an enlarged view of the seed deposit area is shown, with a resilient seed firming attachment 44 fastened by any suitable means such as bolt 27 to the seed tube 26 or other suitable positions on the planter assembly, such as to a seed boot (not shown) in a manner as shown in Highland or Long, to permit flexing and resist the force applied to the seed tube 26 or boot by attachment 44 when flexed. The attachment 44 is placed in a position trailing the discharge opening 46 of the seed tube 26. The resilient seed firming attachment 44 may be cylindrically shaped having a free end 48 which may be sized to readily conform to the bottom of the furrow, extending past the lowermost portion 50 of the seed tube 26. The first section of attachment 44, fastened to the seed tube 26, may be of a rectangular shape at the fastening end. The second section of attachment section 44, may be a generally cylindrical shape for flexing. The third section of a shape generally conforming to the furrow shape, but in contact with only the bottom and the lower portion of the furrow side walls. The length of the attachment 44 from exit of seed tube 26 to free end 48 is sufficient to accommodate all planting depths desired. Other geometric configurations may be utilized to accomplish the function of seed firming.

The seed firming attachment 44 may be formed from a plastic or metal members comprising essentially three sections or a number of pieces. The attachment may be of one piece or each section may be formed separately and joined together to perform its function. The first section, including said first end, does not flex. The second or middle section is flexible and may be forced by pressure into a flexed or curved position. In all cases, the flexing section needs adequate memory to return to its unflexed position when flexing pressure is removed. The third section including the second or free end also does not flex. The third section needs to be formed from smooth and abrasion resistant material for best operation.

As depicted in FIG. 4, the furrow opening device 20 has formed an opened furrow 30" leaving soil residuals 34 lying in the furrow apex 36 of opened furrow 30". The kernels 38 deposited between the resilient seed firming attachment 44 and the discharge opening 46 of the seed boot 26 are lying on the soil above the furrow apex 36 as shown in FIG. 4, and are not located at the desired planting depth or in the best moisture. As the planting unit continues its forward progression, the resilient seed firming attachment 44 is drawn through the opened furrow 30 applying a downward force 52 into the furrow apex 36. Thus, the soil residuals 34 are compacted, substantially reducing if not totally eliminating air pockets 42, and the kernels 38 are firmly positioned into the furrow apex 36. The kernels are thus all positioned at a uniform depth at the best moisture level for uniform emergence.

As shown in FIG. 5, the opened furrow 30" was similar to FIG. 4. The position of the kernel 38 is changed because the resilient seed firming attachment 44 has applied, as it travelled forward, a downward force 52 upon the kernel 38. The soil residuals 34 were compacted by the pressure and the kernel 38 is now firmed in the soil very close to the furrow apex 36 with the air pockets 42 eliminated. The seed is firmed into the furrow at the best moisture level helping to ensure proper germination. The same firming action will result for furrows and seeds as shown in FIG. 4.

The resilient seed firming attachment 44 may be formed substantially as a straight cylindrical shaft 54 (see FIG. 6). However, it may be useful to modify the shaft 54 by varying the size and shape of all the portions which relate to fastening of the attachment 44 to the planter assembly depending upon the configuration of the planter or drill, the shape of the portion in the furrow to assist in the flexing and aid in directing the free fall of the seed. The section applying the force to firm the seed may also be modified in shape to more closely relate to the apex and the furrow side walls to ensure the proper firming of the seed. The cross section should substantially conform to the furrow shape and the cross section should be equal to or slightly larger than the furrow width near the bottom of the furrow at or near its apex, i.e., an inverted "V" shape. When the planting unit 10 is in a non-planting mode, the shaft may be straight (shown in phantom). The operational curve of the shaft is not obtained until the free end 48 of the resilient seed firming attachment 44 contacts the soil and the section becomes horizontal and downward pressure against the soil is applied. The section 48, of firming attachment 44 is fixed, i.e., inflexible. The section 48' (prime) is the flexible section of the firming attachment 44 and 48" (double prime) is the rigid non-flexible section connected to the planter assembly. The overall length of the seed firming attachment 44 is designed so as not to interfere with the function of the furrow closing device 24.

An alternate embodiment of a resilient seed firming attachment 60 is shown in FIG. 7. In this embodiment, seed bounce is further reduced by adding width to the attachment in the upper portion of the furrow. The resilient seed firming attachment 60 is provided with a deflector plate 62, generally formed in wedge shape and primarily in the first section of attachment 60 conforming to, but not in contact with, the opened furrow 30. The width "w" of deflector plate 62 is narrower than that of the furrow opening so as not to disturb the furrow walls 40 and thus prevent "plowing" of the soil. Other modifications and configurations to enlarge seed firming attachment 60 [same as 44] may be made to reduce seed bounce. The lateral forces generated by the shaft 44 working against the soil at the bottom of the furrow operate by following the bottom of the furrow to help maintain the seed tube 26 in a lateral position directly over the center of the furrow to improve seed drop.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appended claims.

What is claimed is:

1. A planting assembly having a furrow opening mechanism, a seed dispensing means, including a seed tube for directing the seeds downwardly and rearwardly as the planting assembly moves forward, and structure for guiding and firming seeds in the furrow as seeds are deposited said furrow having a bottom width less than a top width, comprising:

a resilient member with first and second ends;

a fastening element for attaching and supporting said first end of said resilient member on the planting assembly with the second end of said resilient member having a predetermined width substantially corresponding to lower portion of the furrow extending downwardly and rearwardly applying downward pressure in the bottom of the furrow to firm the seeds into the soil.

2. The invention in accordance with claim 1, wherein said resilient member is generally cylindrical in shape.

3. The invention in accordance with claim 1, wherein said resilient member has varied geometric configurations.

4. The invention in accordance with claim 1, wherein said resilient member flexes between said first and second ends due to the weight of the planting assembly forcing the resilient member against the soil at the bottom of the furrow.

5. The invention in accordance with claim 1, wherein said fastening element for attaching and supporting the first end of said resilient member on said planting assembly retains said resilient member attached to the assembly against the force applied to the second end of said resilient member by the resistance of the soil against the weight of the planting mechanism.

6. The invention in accordance with claim 5, wherein said element for retaining said resilient member is removably attached to said seed tube.

7. The invention in accordance with claim 1, wherein said resilient member is made of plastic.

8. The invention in accordance with claim 1, wherein said resilient member is composed of metal.

9. The invention in accordance with claim 1, wherein said resilient member is composed of three sections; a first inflexible section including said first end, a second flexible section, a third inflexible section including said second end, said first section and said third section connected by said second section.

10. The invention in accordance with claim 9, wherein said third section of said resilient member conforms to the bottom of the furrow.

11. The invention in accordance with claim 9, wherein said first section has a width sufficient to assist the seed tube in placing of seeds in the furrow.

12. The invention in accordance with claim 9, wherein said third section has a cross-section equal to or slightly larger than the furrow width near the bottom of the furrow.

13. The invention in accordance with claim 9, wherein said second section of said resilient member flexes sufficiently to permit said third section to become horizontal at the bottom of the furrow.

14. The invention in accordance with claim 9, wherein said second section of said member has a maximum flexed state and an unflexed state which may flex to its maximum when flexing forces are applied and has a memory which returns the second section to its unflexed state when the flexing force is removed.

15. The invention in accordance with claim 9, wherein the width of said first section of said resilient member substantially conforms to the upper limits of said furrow opening to assist in placement of the seeds in the furrow as the seeds are directed therein.

16. The invention in accordance with claim 9, wherein said three sections of said resilient member form a straight unflexed member when no pressure is applied to said resilient member.

* * * * *

UNITED STATES PATENT AND TRADEMARK OFFICE
CERTIFICATE OF CORRECTION

PATENT NO. : 5,673,638
DATED : October 7, 1997
INVENTOR(S) : Eugene G. Keeton

It is certified that error appears in the above-identified patent and that said Letters Patent is hereby corrected as shown below:

Column 4, Claim 1, line 50, before "lower", insert therefor --the--.

Column 6, Claim 14, line 6, before "member", insert therefor --resilient--.

Column 6, Claim 14, line 9, before "unflexed", insert therefor --original--.

Signed and Sealed this

Thirtieth Day of December, 1997

Attest:

BRUCE LEHMAN

Attesting Officer

Commissioner of Patents and Trademarks